United States Patent
Guarino

(10) Patent No.: US 7,998,427 B2
(45) Date of Patent: Aug. 16, 2011

(54) METHOD FOR CARRYING OUT CHEMICAL REACTIONS IN PSEUDO-ISOTHERMAL CONDITIONS

(75) Inventor: Giuseppe Guarino, Cadro (CH)

(73) Assignee: Methanol Casale S.A. (SE)

(*) Notice: Subject to any disclaimer, the term of this patent is extended or adjusted under 35 U.S.C. 154(b) by 53 days.

(21) Appl. No.: 11/671,257

(22) Filed: Feb. 5, 2007

(65) Prior Publication Data
US 2007/0196251 A1    Aug. 23, 2007

Related U.S. Application Data

(63) Continuation of application No. 10/977,528, filed on Oct. 29, 2004, now abandoned.

(30) Foreign Application Priority Data

Nov. 4, 2003    (EP) .................................. 03025201

(51) Int. Cl.
*F28F 3/00*    (2006.01)
*F28F 3/12*    (2006.01)
*B01J 8/02*    (2006.01)

(52) U.S. Cl. ........ 422/198; 422/200; 422/211; 165/138; 165/168; 165/170

(58) Field of Classification Search .................. 422/198, 422/200, 211; 165/168, 170, 138
See application file for complete search history.

(56) References Cited

U.S. PATENT DOCUMENTS

| | | | |
|---|---|---|---|
| 3,666,423 A | 5/1972 | Muenger | |
| 3,666,682 A | 5/1972 | Muenger | |
| 4,099,559 A * | 7/1978 | Butt | 165/170 |
| 6,183,703 B1 | 2/2001 | Hsu et al. | |
| 6,419,884 B1 | 7/2002 | Strobel et al. | |
| 6,916,453 B2 | 7/2005 | Filippi et al. | |
| 6,955,792 B2 | 10/2005 | Filippi et al. | |
| 7,087,205 B2 | 8/2006 | Filippi et al. | |
| 2002/0117294 A1* | 8/2002 | Filippi et al. | 165/170 |
| 2004/0071606 A1 | 4/2004 | Filippi et al. | |

FOREIGN PATENT DOCUMENTS

| | | |
|---|---|---|
| EP | 1 153 653 A1 | 11/2001 |
| EP | 1 306 126 A1 | 5/2003 |

* cited by examiner

*Primary Examiner* — Jennifer A Leung
(74) *Attorney, Agent, or Firm* — Akerman Senterfitt

(57) ABSTRACT

A method for carrying out chemical reactions in so-called pseudo-isothermal conditions and in a predetermined reaction environment, for example a catalytic bed, comprises the step of arranging in the reaction environment at least one heat exchanger crossed by an operating fluid along a main direction.

2 Claims, 2 Drawing Sheets

US 7,998,427 B2

METHOD FOR CARRYING OUT CHEMICAL REACTIONS IN PSEUDO-ISOTHERMAL CONDITIONS

CROSS REFERENCE TO RELATED APPLICATIONS

This application is a continuation of U.S. patent application Ser. No. 10/977,528, filed Oct. 29, 2004, now abandoned, the entirety of which is herein incorporated by reference.

FIELD OF APPLICATION

The present invention, in its most general aspect, refers to a method for carrying out chemical reactions in so-called pseudo-isothermal conditions, that is in conditions such that the reaction temperature is controlled within a limited range of values around a predetermined optimal value.

In particular, this invention concerns a method of the aforementioned type for controlling the temperature of catalyzed reactions, based upon the use of heat exchangers immersed in a reaction environment, for example in a catalytic bed, in which a predetermined chemical reaction takes place.

Even more specifically, but not restrictively, the method of the present invention comprises the use of plated exchangers immersed in a catalytic bed and internally crossed by an operating heat exchange fluid.

PRIOR ART

It is known that for an optimal completion of exothermic or endothermic chemical reactions it is necessary to remove or, respectively, supply heat to the environment in which the reaction takes place so as to control its temperature in close proximity to a precalculated theoretical value.

It is also known that, for the aforementioned purpose, methods are widely used that make use of heat exchangers of the most varied types, immersed in the reaction environment (generally a catalytic bed) and crossed internally by an appropriate operating heat exchange fluid.

Particularly suitable for the purpose of controlling the pseudo-isothermicity of exothermic or endothermic chemical reactions are plated heat exchangers, equipped with an inlet fitting and an outlet fitting on opposite sides, in such a way as to allow the passage of an operating heat exchange fluid inside them along a predetermined direction.

In particular, such heat exchangers are equipped with an auxiliary distribution circuit of operating heat exchange fluid, which allows the introduction of fresh operating fluid, at a predetermined temperature, inside and at different points of the heat exchanger.

The introduction of fresh operating fluid, at different predetermined points of the heat exchanger, and the mixing thereof with the operating fluid flowing inside the exchanger allow the temperature of the exchanger to be controlled within predetermined limits and consequently allow the conditions of pseudo-isothemicity to be maintained inside the reaction zone.

Although advantageous from some points of view, the methods of the aforementioned prior art suffer from a serious and recognized drawback.

Such methods require indeed the use of reactors comprising two operating heat exchange fluid distribution systems, one to directly feed the heat exchangers through the inlet fitting and one to feed an operating heat exchange fluid to the auxiliary distribution circuit.

For this reason, since the two distribution systems are independent from each other and at the same time in fluid communication through the heat exchangers, the practical embodiment of the methods according to the prior art and the consequent control of the operating conditions of the heat exchangers, respectively, of the reaction zone, are particularly complex and difficult.

SUMMARY OF THE INVENTION

The technical problem forming the basis of the present invention is that of providing a method for carrying out chemical reactions in so-called pseudo-isothermal conditions based upon the use of heat exchangers of the aforementioned type, which on the one hand allows the conditions of pseudo-isothermicity to be maintained in a simple and reliable manner, being on the other hand simple to carry out in practice so as to allow the drawbacks of the prior art described above to be overcome.

The aforementioned technical problem is solved by a method for carrying out chemical reactions in so-called pseudo-isothermal conditions and in a predetermined reaction environment, for example a catalytic bed, comprising the step of arranging in said environment at least one heat exchanger crossed by an operating fluid along a main direction, characterized in that a same flow of operating fluid is fed in many points along said main direction.

The invention also refers to an exchanger having structural and functional characteristics suitable for actuating the present method.

Further characteristics and advantages of the invention will become clearer from the detailed description of an embodiment of the method according to the invention, given hereafter with reference to the attached drawings for indicative and non-limiting purposes.

DETAILED DESCRIPTION OF A PREFERRED EMBODIMENT OF THE INVENTION

Figure 1:
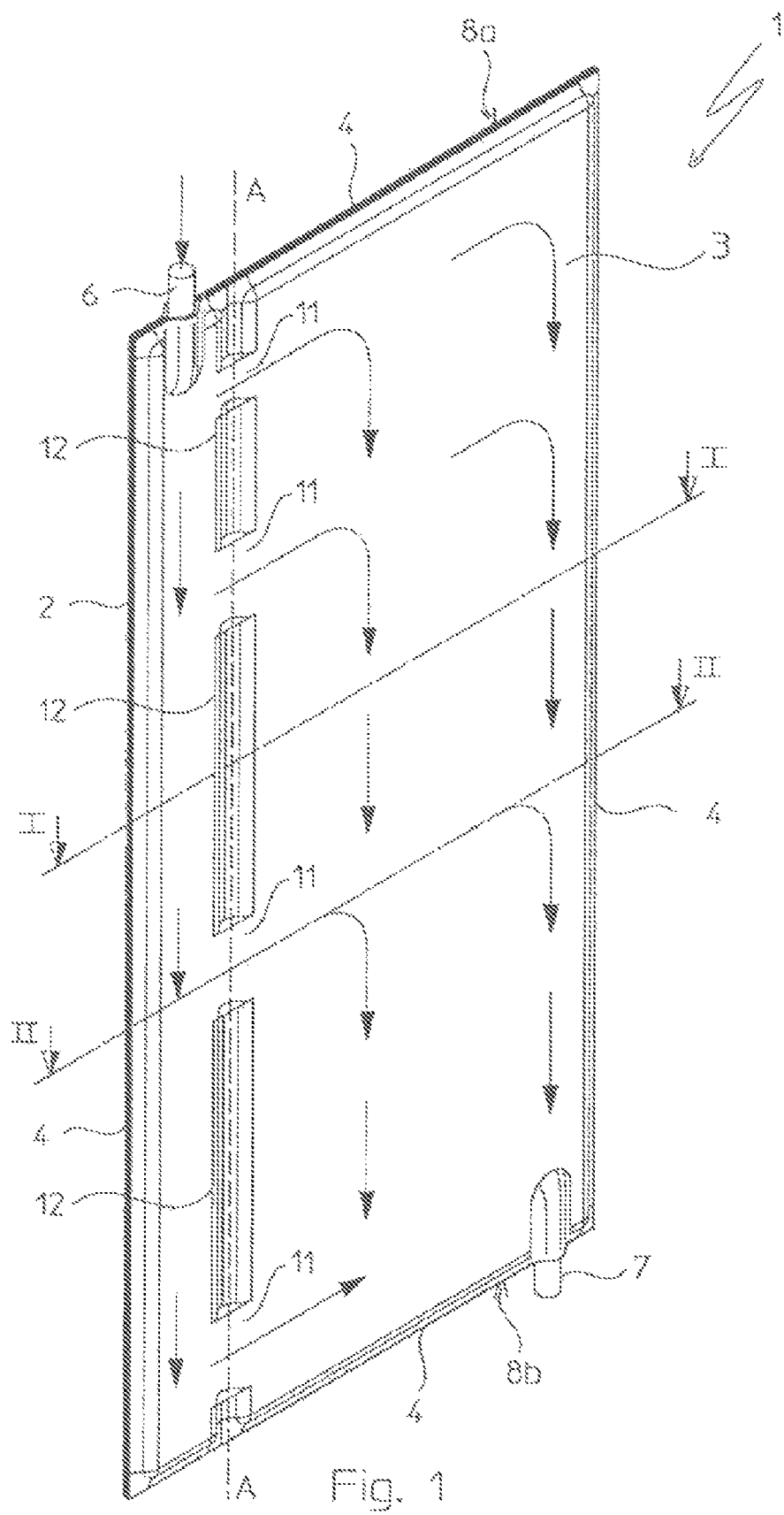
FIG. 1 schematically represents a perspective view of a heat exchanger used to carry out the method according to the present invention.
Figure 2:
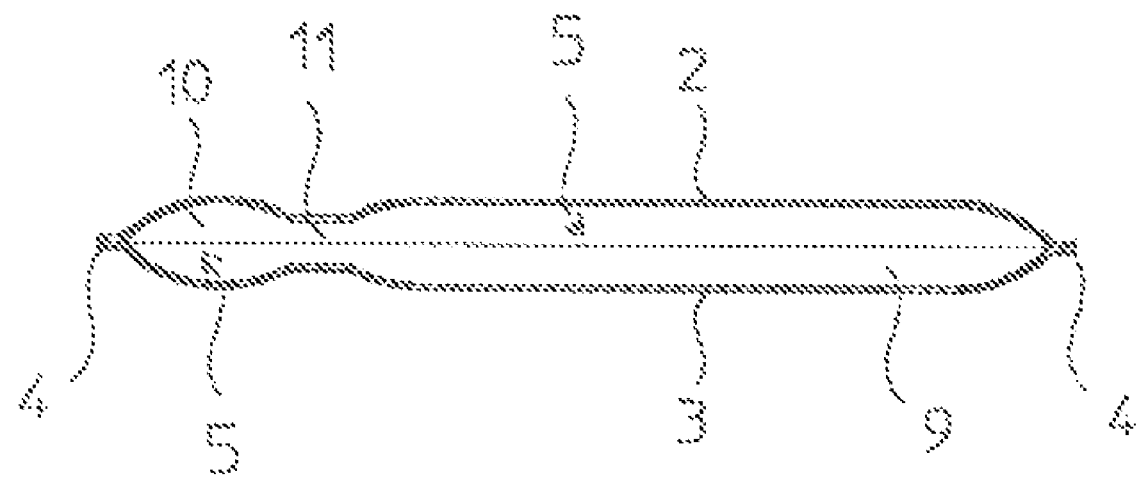
FIG. 2 schematically represents a section view of FIG. 1 along the line II-II.
Figure 3:
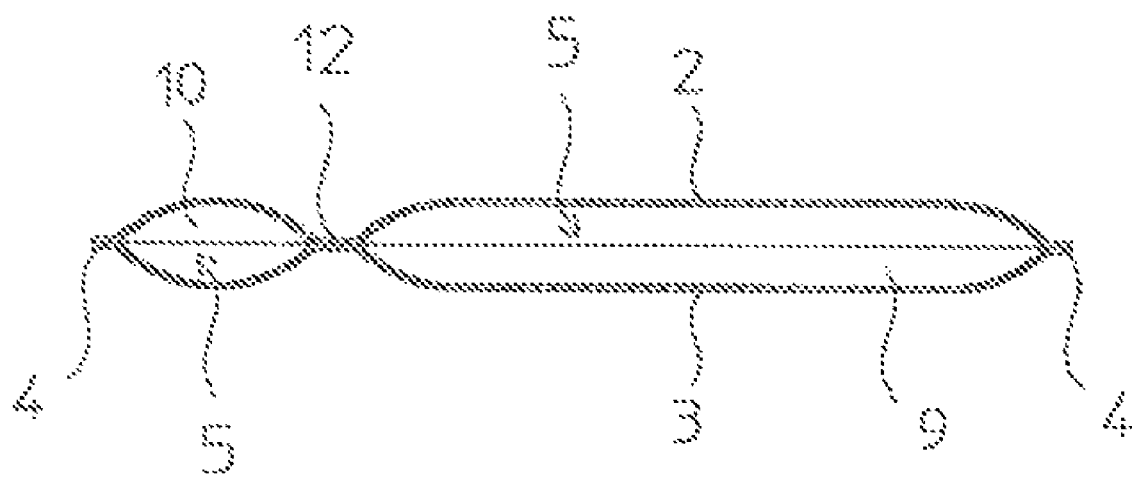
FIG. 3 schematically represents a section view of FIG. 1 along the line I-I.

With reference to the aforementioned figures, a heat exchanger for actuating the method of the present invention is generally indicated with 1.

The heat exchanger 1, having a flattened parallelepiped shape, comprises two metallic plates 2, 3 having low thickness so as to be plastically deformable, substantially flat, juxtaposed and joined in a predetermined spaced relationship through a perimetric welding 4.

Between metallic plates 2, 3 a space 5 is defined, in fluid communication with the outside through a fluid inlet fitting 6 and a fluid outlet fitting 7 positioned on respective opposite short sides 8a and 8b.

Through divider baffles 12 preferably positioned on the same axis A-A, substantially perpendicular to the opposite short sides 8a, 8b in the example of FIG. 1, and formed in the exchanger 1 through plastic deformation of the metallic plates 2, 3, a distribution channel 10 and a heat exchange chamber 9 are defined in said exchanger 1.

The distribution channel 10 is in fluid communication with the outside through the fluid inlet fitting 6 and in fluid communication with the heat exchange chamber 9 through passages 11, also known as distributors, which alternate with the divider baffles 12 along the axis A-A. The heat exchange chamber is also in fluid communication with the outside through the fluid outlet fitting 7.

To carry out the method of the present invention, exchangers of the aforementioned type are arranged inside a reaction zone, for example a catalytic bed, preferably of the fixed type with a granular catalyst, in which a chemical reaction takes place, for example continuously, for example exothermal like methanol synthesis.

For each heat exchanger used, a flow of operating heat exchange fluid at predetermined temperature and pressure is made to flow, through the fitting 6, inside the heat exchanger.

The operating fluid goes down along the distribution channel 10 and flows inside the heat exchange chamber 9 through the passages 11.

It should be noted that such passages 11, which have the function of distributors of the operating fluid, are sized in such a way as to allow the feeding to the heat exchange chamber 9 of a predetermined flow rate of said operating fluid.

The operating fluid that flows inside the heat exchange chamber 9 is responsible for the at least partial removal of the heat generated by the chemical reaction inside the reaction zone and the consequent maintenance of the pseudo—5 isothermal conditions inside the reaction zone itself.

The operating fluid, as it flows inside the chamber 9, undergoes a gradual temperature increase, due to the aforementioned heat exchange with the reaction zone.

The supply of fresh operating fluid through subsequent feedings allows the temperature in the heat exchange chamber 9 to be kept within the predetermined limits, ensuring therefore a removal of generally constant heat along the entire length of the heat exchanger.

The presence of a single operating fluid inlet (fitting 6) advantageously allows such a fluid to be fed at a single predetermined pressure to the heat exchange chamber 9 through all of the distributors 11 and in this way removing the need for a second independent operating fluid distribution system, to the great advantage of the simplicity of actuation of the method according to the invention as well as of the simplicity and reliability of the temperature control inside the heat exchange chamber 9.

In other words, according to the method of the present invention, a single operating fluid distribution circuit is necessary, with the consequent advantageous simplification, from the mechanical point of view, and the consequent saving in time and resources when a reactor using the exchanger described above is operated and maintained.

The invention thus conceived is susceptible to farther variants and modifications all of which are within the capabilities of the man skilled in the art and, as such, fall within the scope of protection of the invention itself, as defined by the following claims.

The invention claimed is:

1. A method for carrying out chemical reactions in pseudo-isothermal conditions and in a predetermined reaction environment, comprising the step of:
    feeding a first flow of an operating fluid in a heat exchange chamber of at least one heat exchanger arranged in said environment, said first flow operating fluid crossing said heat exchange chamber of said at least one heat exchanger along a flow direction; and
    feeding further flows of said operating fluid at different points into said first flow of said operating fluid flowing in said heat exchange chamber along said flow direction,
    wherein said heat exchange chamber fed by the plurality of flows of operating fluid is the sole heat exchange chamber of the at least one heat exchanger, and
    wherein said first flow of said operating fluid and said further flows of said operating fluid are all fed into said heat exchange chamber through a same distribution channel of the at least one heat exchanger.

2. The method according to claim 1, wherein the predetermined reaction environment is a catalytic bed.

\* \* \* \* \*